D. A. GRAY.
SPRING WHEEL.
APPLICATION FILED MAY 24, 1913.
1,086,162.
Patented Feb. 3, 1914.
2 SHEETS—SHEET 1.
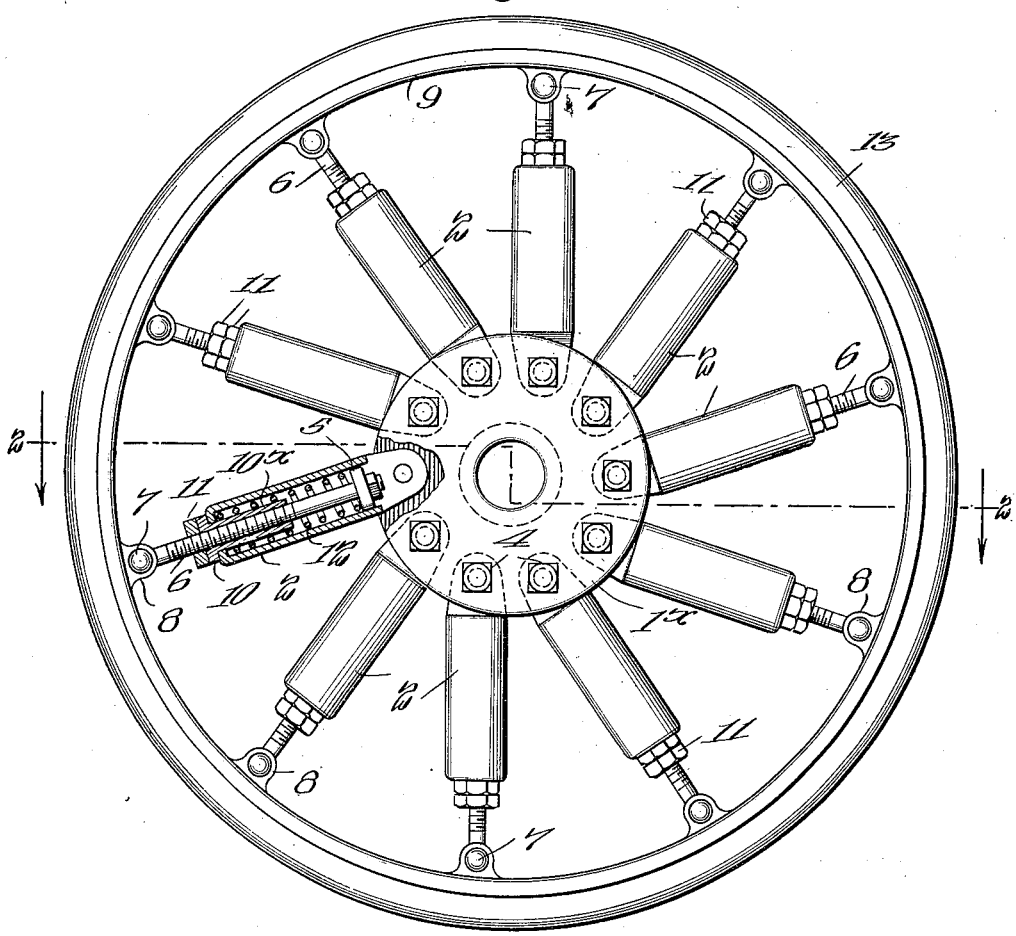
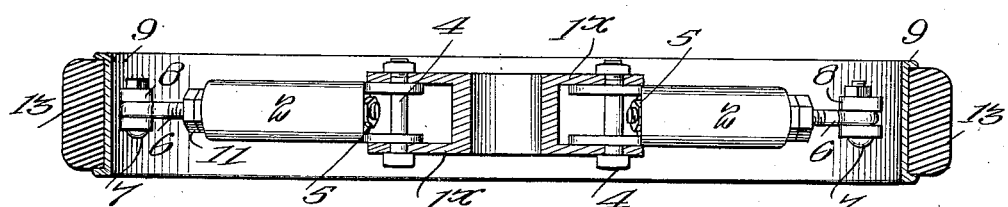
WITNESSES
INVENTOR
DAVIE A. GRAY,
BY
ATTORNEYS

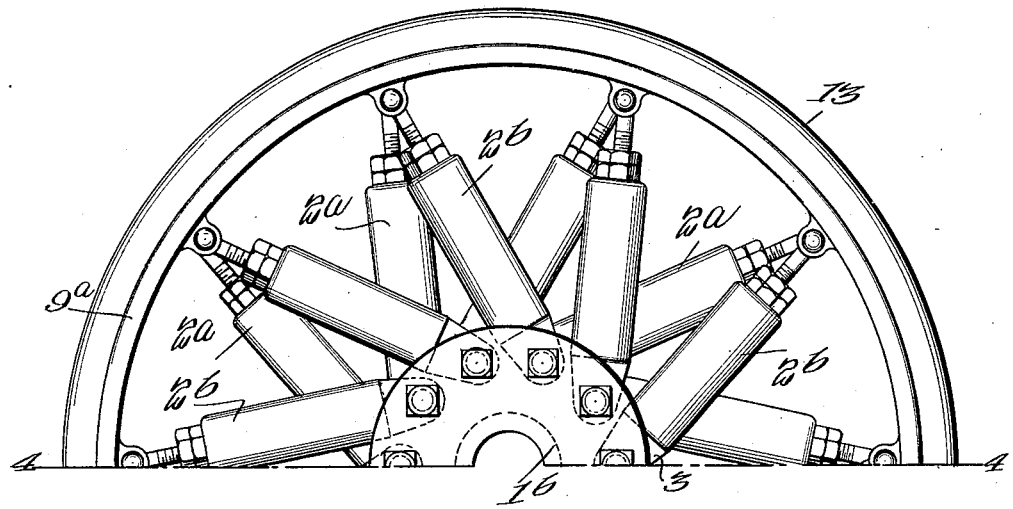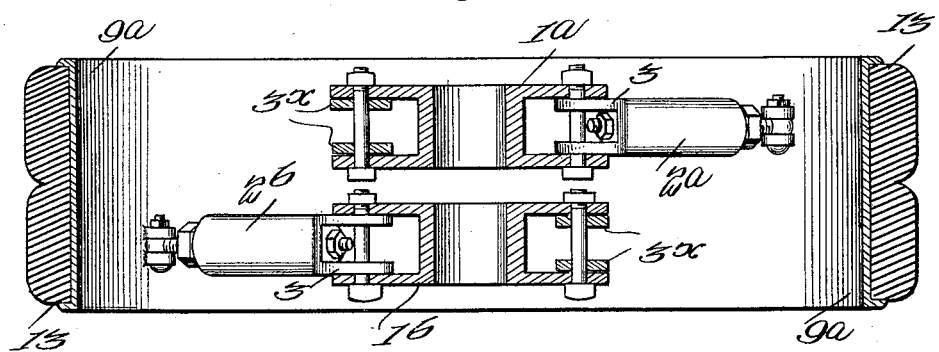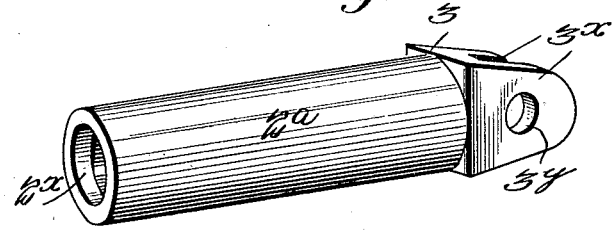

UNITED STATES PATENT OFFICE.

DAVIE A. GRAY, OF CHATTANOOGA, TENNESSEE, ASSIGNOR OF ONE-HALF TO LOUIS A. D. MERCIER, OF NEW ORLEANS, LOUISIANA.

SPRING-WHEEL.

1,086,162.   Specification of Letters Patent.   Patented Feb. 3, 1914.

Application filed May 24, 1913. Serial No. 769,594.

*To all whom it may concern:*

Be it known that I, DAVIE A. GRAY, a citizen of the United States, and a resident of Chattanooga, in the county of Hamilton and State of Tennessee, have invented an Improvement in Spring-Wheels, of which the following is a specification.

My invention relates to improvements in spring wheels and consists in the combinations, constructions, and arrangements herein described and claimed.

An object of my invention is to provide a device which will have the advantages of a pneumatic tire but which will not subject the owner of the vehicle to the delays incident to punctures and blow-outs such as occur with pneumatic tires.

A further object of my invention is to provide a device in which the various strains coming upon the wheel are to a large extent equalized so as to be borne by various parts of the wheel.

A further object of my invention is to provide a spring wheel in which the various parts of the wheel will accommodate themselves to the strains incident to turning a corner, so that the wheel will operate as satisfactorily in turning corners as when running in a straight-away course.

A further object of my invention is to provide a spring wheel in which the sudden starting of the engine will result in a slight turning of the hub, thereby relieving the wheel of sudden jar or shock.

Other objects of the invention will appear in the following specification and the novel features of the invention will be pointed out in the appended claims.

My invention is illustrated in the accompanying drawings forming part of this application in which—

Figure 1 is a face view of the wheel, one of the spokes being shown in section, Fig. 2 is a section on the line 2—2 of Fig. 1, Fig. 3 shows a portion of a modified form of wheel, Fig. 4 is a section on the line 4—4 of Fig. 3, and Fig. 5 is a perspective view of one of the cylindrical spokes.

In carrying out my invention, I provide a hub 1 which may be of any suitable material and which is provided with laterally extending flanges or plates $1^x$. The spokes are formed of hollow cylindrical members like that shown at $2^a$ in Fig. 5. These members are provided with a flange $2^x$ at one end and with a head 3 at the other. The head 3 has side flanges $3^x$ which constitute an integral part of the cylindrical spoke member 2. The flanges $3^x$ are designed to enter between the flanged portion $1^x$ of the hub and to be pivotally secured thereto by means of bolts 4 which pass through openings $3^y$ in the flanges $3^x$.

Disposed in each of the cylinders 2 is a plunger 5 provided with a threaded plunger rod 6 which is pivotally secured at 7 to a bracket 8 carried by the inner part of the rim 9.

At 10 and 11, I have shown two nuts which are mounted on the threaded portion of the plunger stem 6. The nut or head 10 has an extended portion or sleeve $10^x$—see Fig. 1—arranged to extend through the open end of the cylinder 2. The nut 11 serves as a lock nut for the nut 10. A spiral spring 12 is disposed between the end of the cylinder 2 and the plunger 5.

From the foregoing description of the various parts of the device, the operation thereof may be readily understood. The device is preferably provided with a solid rubber tire 13, although in some instances it may be used without this tire. It will be observed that the pivotal point 7 and the pivot bolt 4 are not in alinement with the center of the hub. In other words, the spring spokes are set at an angle with respect to the radial line extending from the center of the hub through the pivotal point 7. The springs 12 are placed in the cylinders under slight compression.

When the vehicle is standing still, the weight is distributed over most of the spokes on the upper part of the wheel, that is, the weight tends to be suspended virtually by means of the springs in the cylinders; the greater the weight, of course, the greater will be the tension on these springs. When the vehicle is in motion and an obstruction is encountered, the jar is taken up by the springs. Since the axial line of the cylinders is not through the center of the hub, there will be a rotary movement of the hub, which rotary movement will be resisted by the springs as they are elongated. As soon as the effect of the jar is overcome, the springs return the hub to its normal position.

This device is especially designed for turning corners, for in turning corners there is a tendency for the hubs of the wheels on one side of the device to spring outwardly, i. e., in the direction in which the vehicle is going before it turns. In the present instance, the wheel is so constructed that this tendency toward distortion will be resisted, since the hub has no lateral play.

Should a sudden strain come on the wheel, as when the engine starts up suddenly or when there is sudden resistance applied to the exterior portion of the wheel, such as the rim or tire, there will be a relative movement of the hub and the rim. Thus, if the engine should suddenly start up, the hub will be turned, the spring spokes giving until the motion has been communicated to the outside of the wheel, when the latter will turn. The springs will gradually bring the hub into normal position with respect to the rim as the vehicle proceeds.

The tension of the springs may be varied by means of the nut 10 while the lock nut 11 holds the nut 10 securely in its adjusted position.

In Figs. 3 and 4, I have shown a modified form of the device in which there are two hubs $1^a$ and $1^b$, each provided with hollow cylindrical spokes such as those shown at $2^a$ and $2^b$ respectively, having plungers whose stems are pivotally connected to a common rim $9^a$. As will be observed, the spokes $2^a$ are inclined in opposite directions to the spokes $2^b$. This form of the device is designed to be used for heavy wheels, such as wheels of trucks and the like, and the inclination of one set of spokes to the other tends to equalize the strain on the wheels. Although this form differs from the one described above, nevertheless it involves features which are common to the first form and would therefore fall within the scope of the invention.

A device built as described may be manufactured cheaply. It has many of the advantages of pneumatic tires and eliminates many disadvantages. I am aware that other forms of device based upon the same principle might be made, but I regard as my own all such modifications as fairly fall within the spirit and scope of the invention.

I claim:

1. In a spring wheel, a rim provided with a series of inwardly extending lugs or ears, threaded plunger rods pivotally secured to said ears, each of said plunger rods being provided with a plunger, a cylinder for each plunger, one end of said cylinders being closed and provided with a central opening, the other end being provided with a pair of ears, a sleeve arranged to extend through said central opening and having a collar threaded on the plunger rod arranged to engage the end of the cylinder, a lock nut carried by said plunger rod and arranged to engage said sleeve, a spring disposed within said cylinder and arranged to bear at one end against said plunger and at the other end against the closed end of the cylinder, one end of the spring being disposed between the sleeve and the walls of the cylinder, a hub having a pair of annular flanges arranged to receive the ears on the cylinder, and a pivotal connection passing through said plungers and through said ears for securing a cylinder to the hub.

2. In a spring wheel, a rim provided with a series of inwardly extending lugs or ears, threaded plunger rods pivotally secured to said ears, each of said plunger rods being provided with a plunger, a cylinder for each plunger, one end of said cylinders being closed and provided with a central opening, the other end being provided with a pair of ears, a sleeve arranged to extend through said central opening and having a collar threaded on the plunger rod arranged to engage the end of the cylinder, a lock nut carried by said plunger rod and arranged to engage said sleeve, a spring disposed within said cylinder and arranged to bear at one end against said plunger and at the other end against the closed end of the cylinder, one end of the spring being disposed between the sleeve and the walls of the cylinder, a hub having a pair of annular flanges arranged to receive the ears on the cylinder, and a pivotal connection passing through said plungers and through said ears for securing a cylinder to the hub, the axial lines of all the said plungers passing to one side of the center of the wheel, and the positions of all the cylinders being symmetrical with respect to the center of the wheel.

DAVIE A. GRAY.

Witnesses:
L. A. STANLEY,
SOLON C. KEMON.

---

Copies of this patent may be obtained for five cents each, by addressing the "Commissioner of Patents, Washington, D. C."